(12) United States Patent
Ogata (10) Patent No.: US 7,215,481 B2
(45) Date of Patent: May 8, 2007

(54) TAKING LENS, AND IMAGING DEVICE INCORPORATING THE SAME

(75) Inventor: Yasuji Ogata, Akiruno (JP)

(73) Assignee: Olympus Corporation, Tokyo (JP)

( * ) Notice: Subject to any disclaimer, the term of this patent is extended or adjusted under 35 U.S.C. 154(b) by 156 days.

(21) Appl. No.: 11/016,734

(22) Filed: Dec. 21, 2004

(65) Prior Publication Data

US 2005/0134968 A1    Jun. 23, 2005

(30) Foreign Application Priority Data

Dec. 22, 2003  (JP) .............................. 2003-425107
Dec. 22, 2003  (JP) .............................. 2003-425108

(51) Int. Cl.
 G02B 15/14    (2006.01)
 G02B 15/02    (2006.01)
 G02B 7/02     (2006.01)

(52) U.S. Cl. ....................... 359/682; 359/672; 359/684;
  359/686; 359/689; 359/740; 359/752; 359/753;
  359/761; 359/770; 359/782; 359/784; 359/827;
  359/829; 359/830

(58) Field of Classification Search ........ 359/672–676,
  359/680, 682, 684, 686, 689, 740, 752, 753,
  359/761, 770, 781, 782, 784, 827, 829, 830
  See application file for complete search history.

(56) References Cited

U.S. PATENT DOCUMENTS

| 3,832,035 | A  | * | 8/1974 | Takahashi ................... 359/708 |
| 5,920,435 | A  | * | 7/1999 | Shibayama ................. 359/686 |
| 6,101,043 | A  | * | 8/2000 | Kohno et al. ............... 359/687 |
| 6,728,482 | B2 | * | 4/2004 | Hagimori et al. ........... 359/689 |
| 2002/0015235 | A1 | * | 2/2002 | Hirose ........................ 359/684 |
| 2003/0103268 | A1 | * | 6/2003 | Nishikawa et al. ......... 359/683 |
| 2004/0012704 | A1 | * | 1/2004 | Hagimori et al. ........... 348/335 |
| 2004/0027685 | A1 | * | 2/2004 | Mihara et al. .............. 359/686 |

* cited by examiner

*Primary Examiner*—Evelyn A. Lester
(74) *Attorney, Agent, or Firm*—Kenyon & Kenyon LLP

(57) ABSTRACT

A taking lens system includes, in order from an object side thereof, a first lens group (negative refracting), a second lens group (positive refracting), an aperture stop and a third lens group (positive refracting). Focusing from an infinite distance to a finite distance is performed by setting the second lens group and the third lens group such that the position of the second lens group upon focusing on a finite distance is located on an image side of the taking lens system with respect to the position of the second lens group upon focusing on an infinite distance and the position of the third lens group upon focusing on a finite distance is located on an object side of the taking lens system with respect to the position of the third lens group upon focusing on an infinite distance, while the first lens group remains fixed.

16 Claims, 9 Drawing Sheets

TAKING LENS, AND IMAGING DEVICE INCORPORATING THE SAME

This application claims benefit of Japanese Application Nos. 2003-425107 and 2003-425108 filed in Japan on Dec. 22, 2003, the contents of which are incorporated by this reference.

BACKGROUND OF THE INVENTION

The present invention relates generally to a taking lens and an imaging device that incorporates the same, and more particularly to a taking lens well fit for use on interchangeable lens cameras and an imaging device that incorporates the same.

So far, taking lens systems of the negative-positive-positive type with a leadoff negative lens group have been proposed in the art.

For some taking lenses of the negative-positive-positive type with a negative lens group out front wherein a front lens group is designed to move for focusing, however, it is required to rely on means for preventing entrance of dust into a lens barrel during focusing. With power-operated focusing, there is a problem that much power is consumed because of movement of a lens group susceptible of a large lens diameter.

A problem with taking lens systems of the type wherein the first lens group stays fixed is that aberrations are likely to fluctuate with focusing.

SUMMARY OF THE INVENTION

In view of such prior art problems as described above, the primary object of the invention is to provide a taking lens system of the type with a negative lens group out front, wherein entrance of dust into a lens barrel during focusing is substantially prevented and fluctuations of aberrations with zooming are substantially minimized, and a imaging device that incorporates the same.

According to the present invention, this object is achievable by the provision of a taking lens system comprising, in order from an object side thereof, a first lens group having negative refracting power, a second lens group having positive refracting power, an aperture stop and a third lens group having positive refracting power, wherein:

focusing from an infinite distance to a finite distance is performed by setting said second lens group and said third lens group such that a position of said second lens group upon focusing on a finite distance is located on an image side of said taking lens system with respect to a position of said second lens group upon focusing on an infinite distance and a position of said third lens group upon focusing on a finite distance is located on an object side of said taking lens system with respect to a position of said third lens group upon focusing on an infinite distance, while said first lens group remains fixed.

The advantages of, and the requirements for, the taking lens system according to the invention are now explained.

When the taking lens system is constructed as being generally of the retrofocus type that comprises, in order from its object side, a negative lens group, a positive lens group and a positive lens group, it is easy to achieve a wide-angle arrangement with a long back focus.

The stop should be interposed between the second lens group of positive refracting power and the third lens group of positive refracting power for the purpose of minimizing negative distortion likely to occur throughout a lens system of the retrofocus type.

The first lens group should remain fixed upon focusing from an infinite distance to a finite distance, so that entrance of dust into a lens barrel during focusing can be prevented. It is also possible to keep power consumptions low at the time of power-operated focusing, again because the first lens group that tend to increase relatively in diameter stays fixed.

The positive second lens group and the positive third lens group with the aperture stop interposed between them should be set such that the position of the second lens group upon focusing on a finite distance is located on an image side of the taking lens system with respect to the position of the second lens group upon focusing on an infinite distance and the position of the third lens group upon focusing on a finite distance is located on an object side of the taking lens system with respect to the position of the third lens group upon focusing on an infinite distance, so that aberrations produced with focusing can be easily canceled out.

In this case, the taking lens system could be designed such that upon focusing from an infinite distance to a finite distance, the second lens group moves only toward the image side and the third lens group moves only toward the object side.

It is desired that the first lens group and the third lens group each comprise an aspheric surface, wherein the aspheric surface in the first lens group is located in at least the position of a refracting surface nearest to the image plane side of the first lens group.

Location of the aspheric lens in each of the first and third lens groups is favorable for correction of off-axis aberrations, and location of the aspheric surface in the position of the refracting surface nearest to the image plane side of the first lens group is particularly favorable for compactness while aberrations are corrected.

For the taking lens system, it is desired to satisfy the following condition (1):

$$f_B/IM > 1.5 \tag{1}$$

where $f_B$ is a distance of the exit surface in the third lens group to an image plane as calculated on an air basis, and IM is an image circle (diameter) of the taking lens system.

Condition (1) is to define a back focus with respect to the image circle. Falling short of the lower limit of 1.5 to that condition is not preferable because the back focus becomes too small with respect to the image circle, leading to an unacceptable decrease in space areas for receiving optical members such as a quick return mirror, an optical path splitter prism and a filter.

For the taking lens system, it is desirable to satisfy the following condition (2):

$$f_2/f > 5.0 \tag{2}$$

where $f_2$ is a focal length of the second lens group, and f is a focal length of the taking lens system.

Condition (2) is to define the focal length of the second lens group. As the lower limit of 5.0 to that condition is not reached, the focal length of the second lens group becomes too short, rendering aberrations more likely to occur.

The taking lens system could be constructed such that a second lens located in the first lens group as counted from its object side is a positive lens.

The taking lens system could be constructed such that the second lens located in the first lens group as counted from its object side is a positive meniscus lens convex on its object side.

The taking lens system could be constructed such that a lens located nearest to the image plane side of the first lens group is a positive lens.

The taking lens system could be constructed such that the lens located nearest to the image plane side of the first lens group is a positive meniscus lens convex on its object side.

The taking lens system could be constructed such that the third lens group located in the image side thereof with respect to the aperture stop comprises, in order from an object side thereof, a subunit 3-1 having negative refracting power, a subunit 3-2 having positive refracting power, and a subunit 3-3 comprising a lens of negative refracting power and a lens of positive refracting power.

The taking lens system could be constructed such that the third lens group located in the image side thereof with respect to the aperture stop comprises, in order from an object side thereof, a subunit 3-1 having negative refracting power, and a subunit 3-2 having positive refracting power.

For the taking lens system, it is desirable to further comprise a holder frame for holding the first, the second and the third lens group in place, and a mount for making that holder frame attachable to, and detachable from, the body portion thereof.

The taking lens system of the invention can be easily assembled with a long back focus, and so lend itself to an interchangeable lens for lens interchangeable type single-lens reflex cameras as an example.

According to the invention, therefore, it is possible to achieve an imaging device comprising such a taking lens system as mentioned above and an image pickup device located on an image plane side thereof.

With the taking lens system of the negative-positive-position type wherein focusing from an infinite distance to a finite distance is performed by setting the second lens group and the third lens group such that the position of the second lens group upon focusing on a finite distance is located on an image side of the taking lens system with respect to the position of the second lens group upon focusing on an infinite distance and the position of the third lens group upon focusing on a finite distance is located on an object side of the taking lens system with respect to the position of the third lens group upon focusing on an infinite distance, while the first lens group remains fixed, it is possible to achieve a wide-angle arrangement that is generally of the retrofocus type with a long back focus. By interposing the stop between the second lens group of positive refracting power and the third lens group of positive refracting power, it is possible to minimize negative distortion. By allowing the first lens group to stay fixed upon focusing, it is possible to prevent entrance of dust into the lens barrel during focusing. When focusing is carried out in a power-operated fashion, power consumptions can be kept low because the first lens group susceptible of a large lens diameter is permitted to remain fixed.

Still other objects and advantages of the invention will in part be obvious and will in part be apparent from the specification.

The invention accordingly comprises the features of construction, combinations of elements, and arrangement of parts, which will be exemplified in the construction hereinafter set forth, and the scope of the invention will be indicated in the claims.

DESCRIPTION OF THE PREFERRED EMBODIMENTS

Examples 1–4 of the inventive taking lens system are now explained with reference to the accompanying drawings.

FIGS. 1 to 4 are illustrative in axial section of Examples 1 to 4 upon focusing on (a) an object point at infinity and (b) a nearby object point. Throughout FIGS. 1–4, G1 stands for a first lens group; G2 a second lens group; S an aperture stop; G3 a third lens group; F a plane-parallel plate such as a low-pass filter; and I an image plane. The plane-parallel plate F is provided on its surface with an infrared cut coating. FIGS. 5–8 are aberration diagrams for spherical aberration, field curvature, distortion and chromatic aberration of magnification of Examples 1–4 upon focusing on (a) an object point at infinity and (b) a nearby object point. Throughout FIGS. 5–8, "FIY" is indicative of an image height.

EXAMPLE 1

Figure 1A:
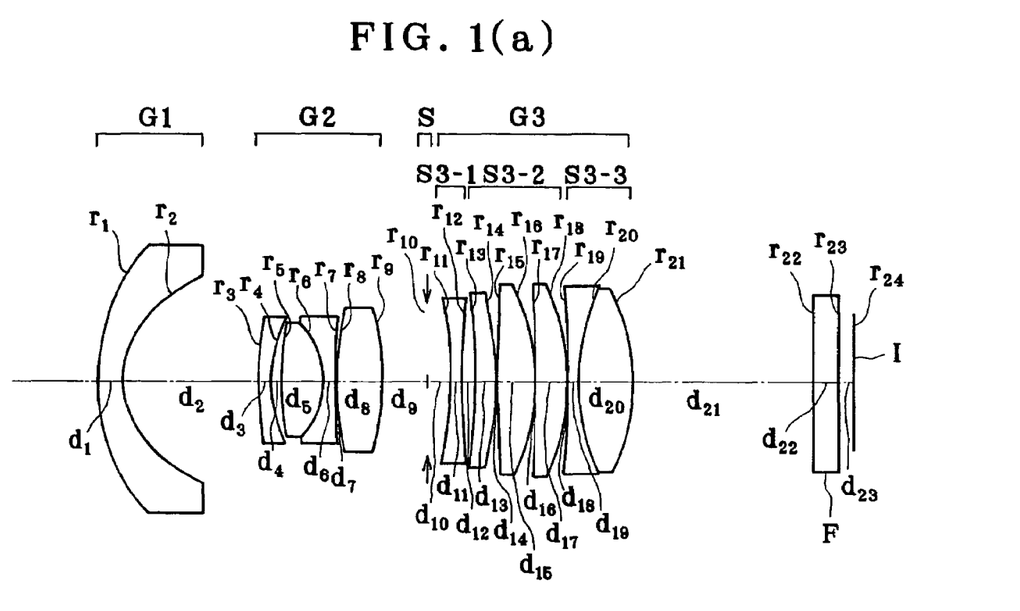
FIGS. 1(a) and 1(b) are illustrative in axial section of the taking lens system of Example 1 according to the invention upon focusing on (a) an object point at infinity and (b) a nearby object point, respectively.
Figure 1B:
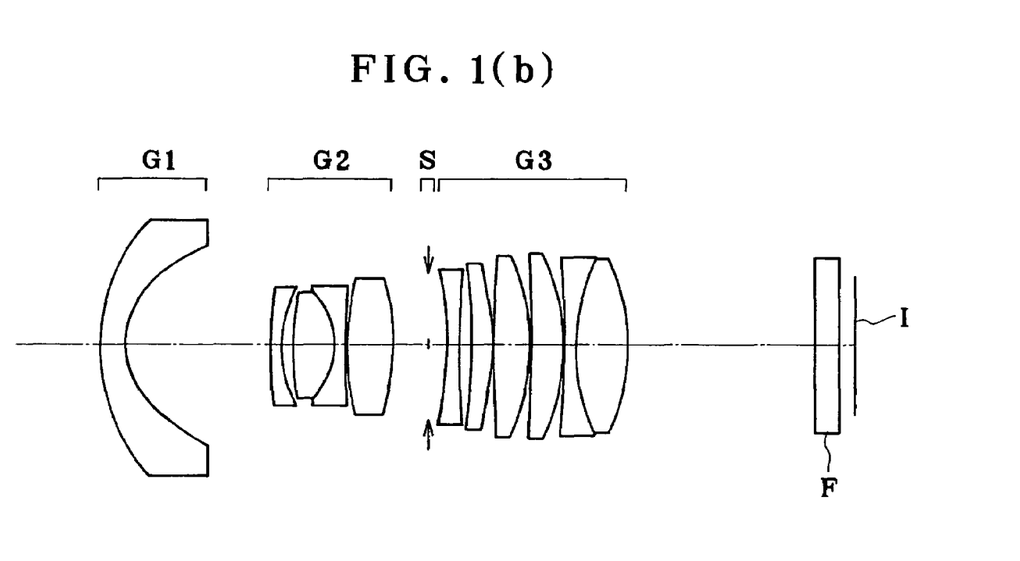

This example is directed to a taking lens system made up of, in order from its object side, a first lens group G1 of negative refracting power, a second lens group G2 of positive refracting power, an aperture stop S and a third lens group G3 of positive refracting power, as shown in FIGS. 1(a) and 1(b). Upon focusing from an infinite distance to a finite distance, the first lens group G1 and the aperture stop S remain fixed, and the second lens group G2 and the third lens group G3 move toward the image side and the object side of the taking lens system, respectively.

Referring to the makeup of each lens group, the first lens group G1 consists of one negative meniscus lens convex on its object side, the second lens group G2 consists of four lenses, i.e., a negative meniscus lens convex on its object side, a doublet of a double-convex positive lens and a double-concave negative lens, and a double-convex positive lens. The third lens group G3 consists of a subunit S3-1 (3-1)

of negative refracting power, a subunit S3-2 (3-2) of positive refracting power and a subunit S3-3 (3-3) composed of a lens of negative refracting power and a lens of positive refracting power, wherein the subunit S3-1 (3-1) consists of one double-concave negative lens, the subunit S3-2 (3-2) consists of three lenses, i.e., a positive meniscus lens convex on its image side, a double-convex positive lens and a positive meniscus lens convex on its image side, and the subunit S3-3 (3-3) consists of two lenses, i.e., a double-concave negative lens and a double-convex positive lens.

Two aspheric surfaces are used, one at the image-side surface of the negative meniscus lens in the first lens group G1 and another at the image-side surface of the positive meniscus lens on the object side of the subunit S3-2 (3-2) in the third lens group G3.

The taking lens system of the instant example is focusable from an infinite object distance up to a nearby distance of 150 mm.

EXAMPLE 2

Figure 2A:
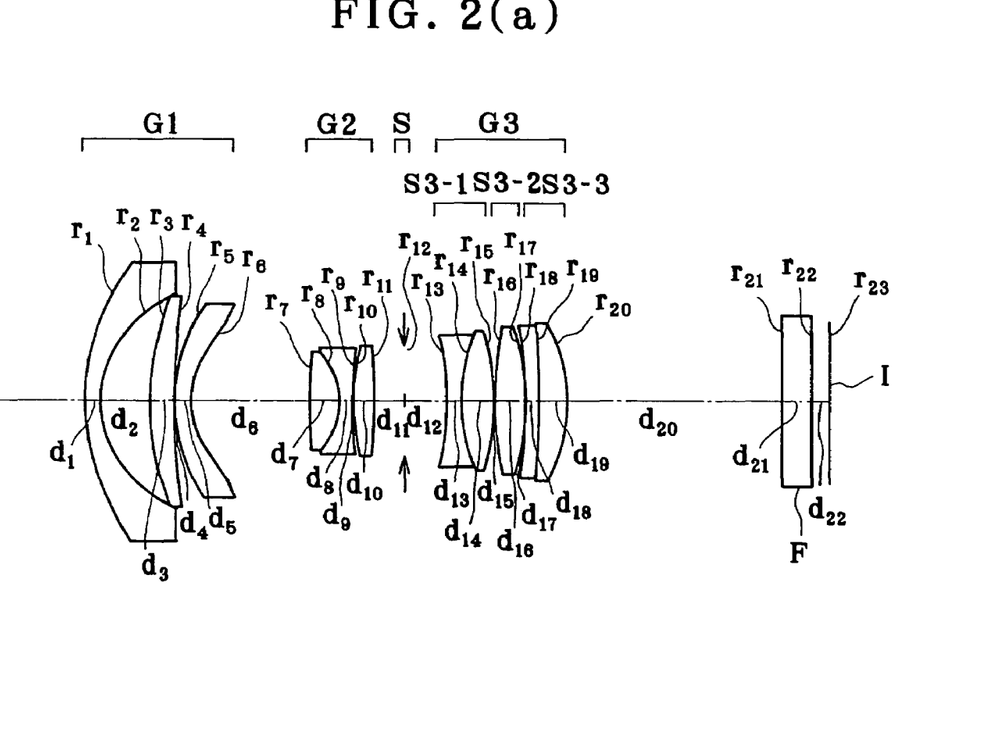
FIGS. 2(a) and 2(b) are similar to FIGS. 1(a) and 1(b), illustrating the taking lens system of Example 2 according to the invention.
Figure 2B:
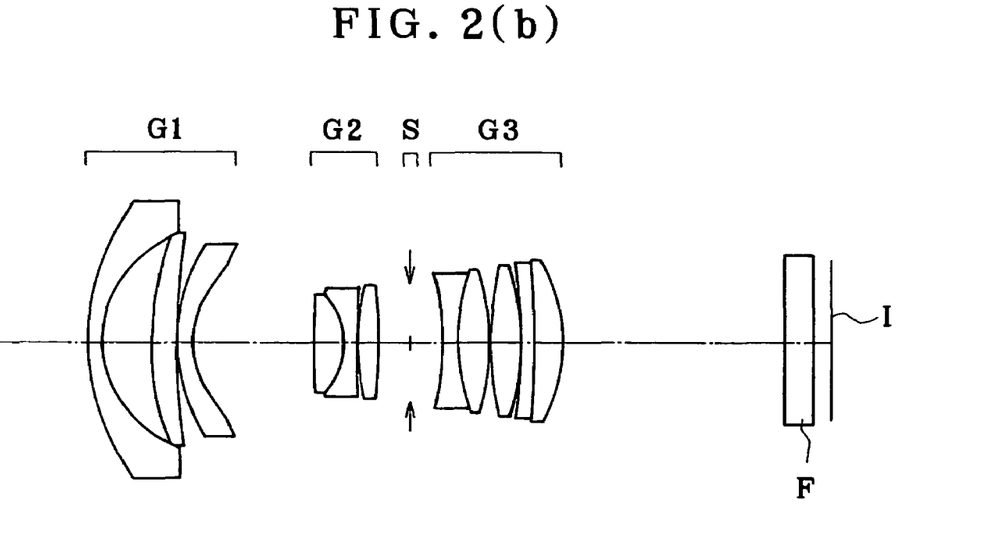

This example is directed to a taking lens system made up of, in order from its object side, a first lens group G1 of negative refracting power, a second lens group G2 of positive refracting power, an aperture stop S and a third lens group G3 of positive refracting power, as shown in FIGS. 2(a) and 2(b). Upon focusing from an infinite distance to a finite distance, the first lens group G1 remains fixed, and the second lens group G2 and the aperture stop S move toward the image side of the taking lens system while the third lens group G3 moves toward the object side thereof.

Referring to the makeup of each lens group, the first lens group G1 consists of three lenses, i.e., a negative meniscus lens convex on its object side, a positive meniscus lens convex on its object side and a negative meniscus lens convex on its object side, and the second lens group G2 consists of three lenses, i.e., a doublet of a double-convex positive lens and a double-concave negative lens, and a double-convex positive lens. The third lens group G3 consists of a subunit S3-1 (3-1) of negative refracting power, a subunit S3-2 (3-2) of positive refracting power and a subunit S3-3 (3-3) composed of a lens of negative refracting power and a lens of positive refracting power, wherein the subunit S3-1 (3-1) consists of two lenses, i.e., a doublet of double-concave negative lens and a double-convex positive lens, the subunit S3-2 (3-2) consists of one double-convex positive lens, and the subunit S3-3 (3-3) consists of two lenses, i.e., a doublet of a negative meniscus lens convex on its image side and a positive meniscus lens convex on its image side.

Two aspheric surfaces are used, one at the image-side surface of the negative meniscus lens on the image side of the first lens group G1 and another at the image-side surface of the double-convex positive lens in the subunit S3-2 (3-2) in the third lens group G3.

In the instant example, the taking lens system is focusable from an infinite object distance up to a nearby distance of 150 mm.

EXAMPLE 3

Figure 3A:
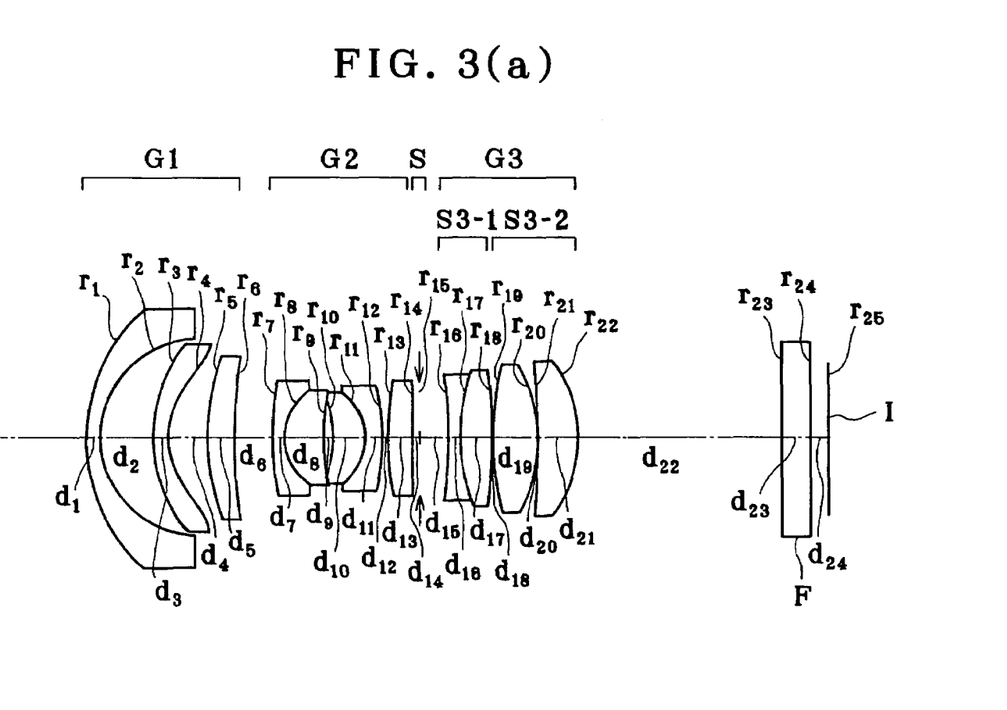
FIGS. 3(a) and 3(b) are similar to FIGS. 1(a) and 1(b), illustrating the taking lens system of Example 3 according to the invention.
Figure 3B:
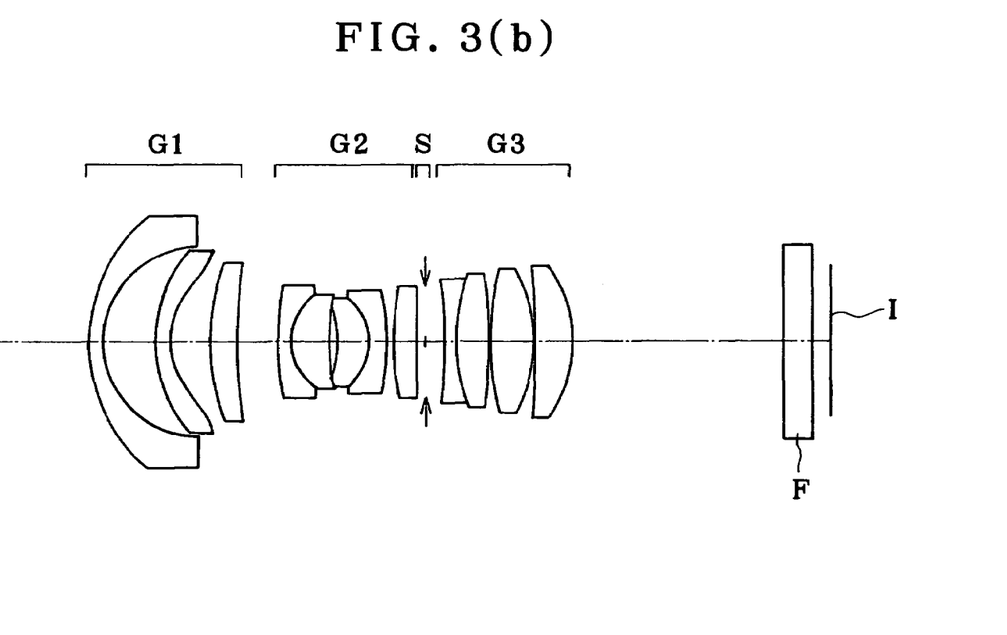

This example is directed to a taking lens system made up of, in order from its object side, a first lens group G1 of negative refracting power, a second lens group G2 of positive refracting power, an aperture stop S and a third lens group G3 of positive refracting power, as shown in FIGS. 3(a) and 3(b). Upon focusing from an infinite distance to a finite distance, the first lens group G1 stays fixed, and both the second lens group G2 and the aperture stop S move toward the image side of the taking lens system while the third lens group G3 moves toward the object side thereof.

Referring to the makeup of each lens group, the first lens group G1 consists of three lenses, i.e., two negative meniscus lenses each convex on its object side and a positive meniscus lens convex on its object side, and the second lens group G2 consists of five lenses, i.e., a doublet of a negative meniscus lens convex on its object side and a positive meniscus lens convex on its object side, a doublet of a positive meniscus lens convex on its image side and a negative meniscus lens convex on its image side, and a double-convex positive lens. The third lens group G3 consists of a subunit S3-1 (3-1) of negative refracting power and a subunit S3-2 (3-2) of positive refracting power, wherein the subunit S3-1 (3-1) is composed of two lenses, i.e., a doublet of a double-concave negative lens and a double-convex positive lens, and the subunit S3-2 (3-2) is composed of two lenses, i.e., a double-convex positive lens and a positive meniscus lens convex on its image side.

Three aspheric surfaces are used, one at the image-side surface of the negative meniscus lens on the image side of the first lens group G1 and two at both surfaces of the double-convex positive lens in the subunit S3-2 (3-2) in the third lens group G3.

In the instant example, the taking lens system is focusable from an infinite object distance up to a nearby distance of 150 mm.

EXAMPLE 4

Figure 4A:
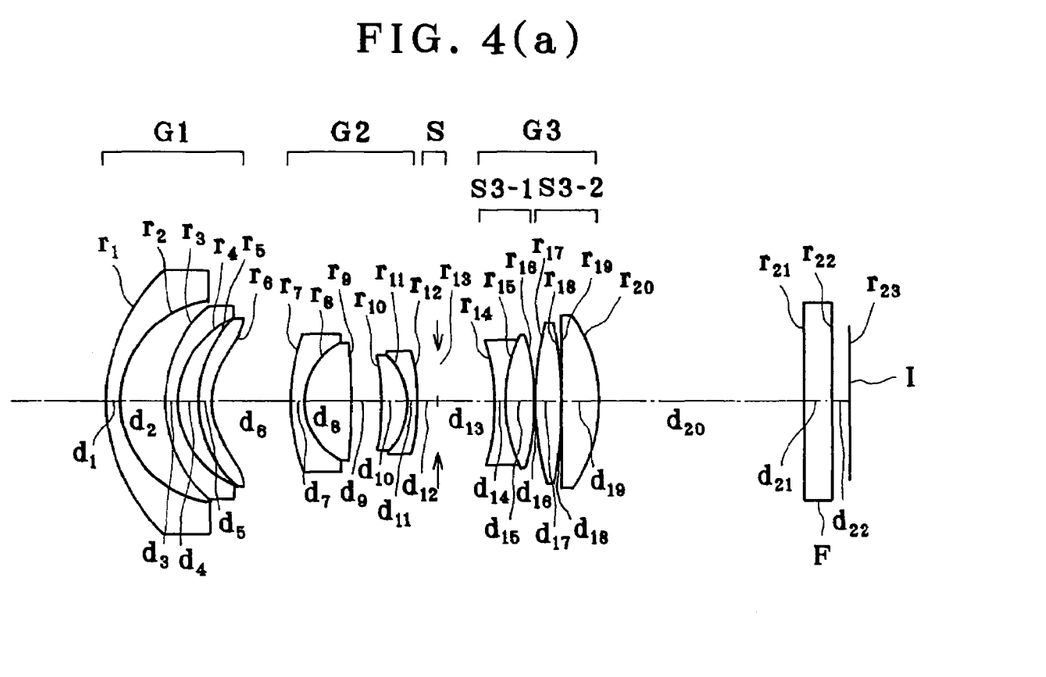
FIGS. 4(a) and 4(b) are similar to FIGS. 1(a) and 1(b), illustrating the taking lens system of Example 4 according to the invention.
Figure 4B:
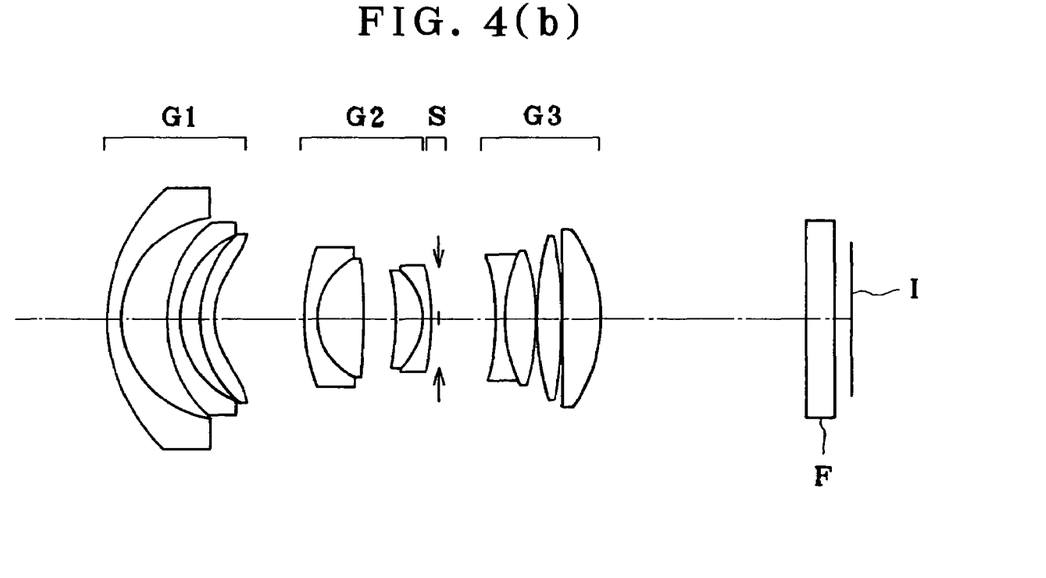
Figure 5A:
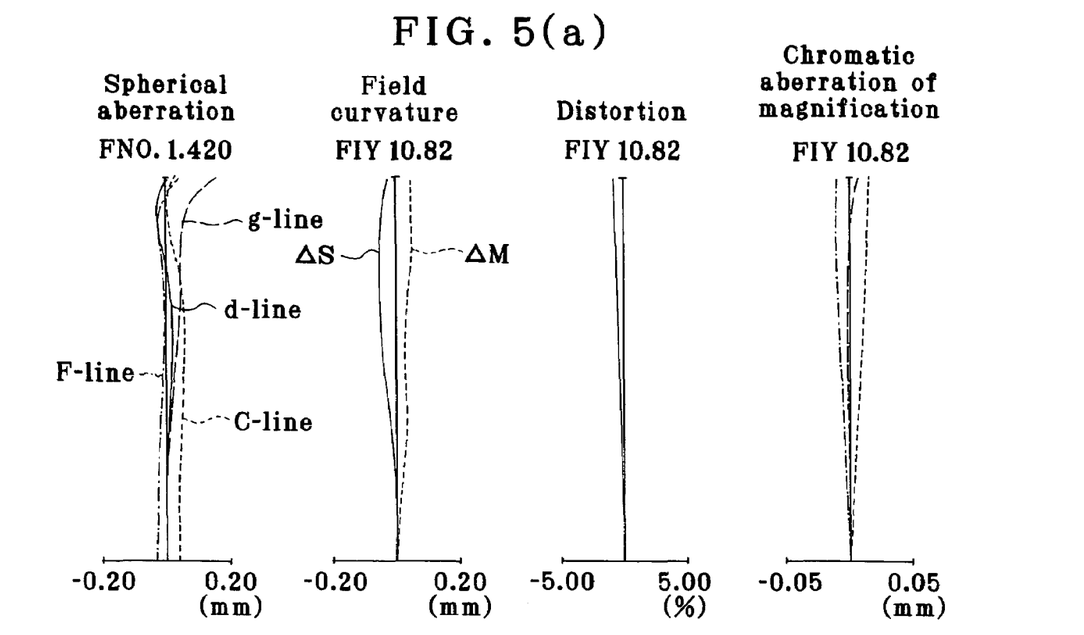
FIGS. 5(a) and 5(b) are aberration diagrams for spherical aberration, field curvature, distortion and chromatic aberration of magnification of Example 1 upon focusing on (a) an object point at infinity and (b) a nearby object point.
Figure 5B:
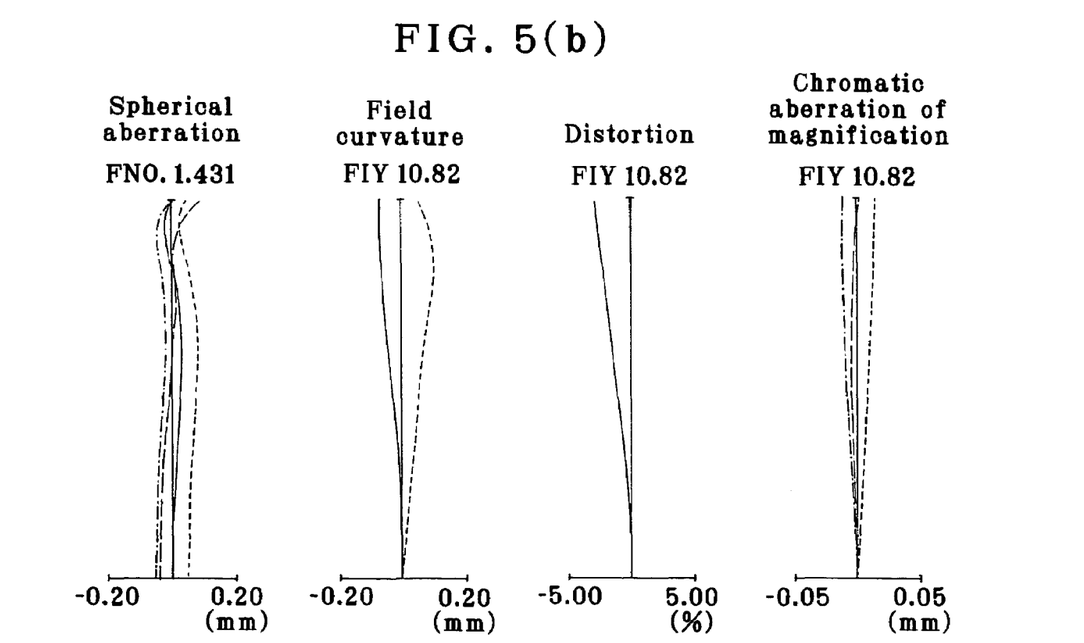
Figure 6A:
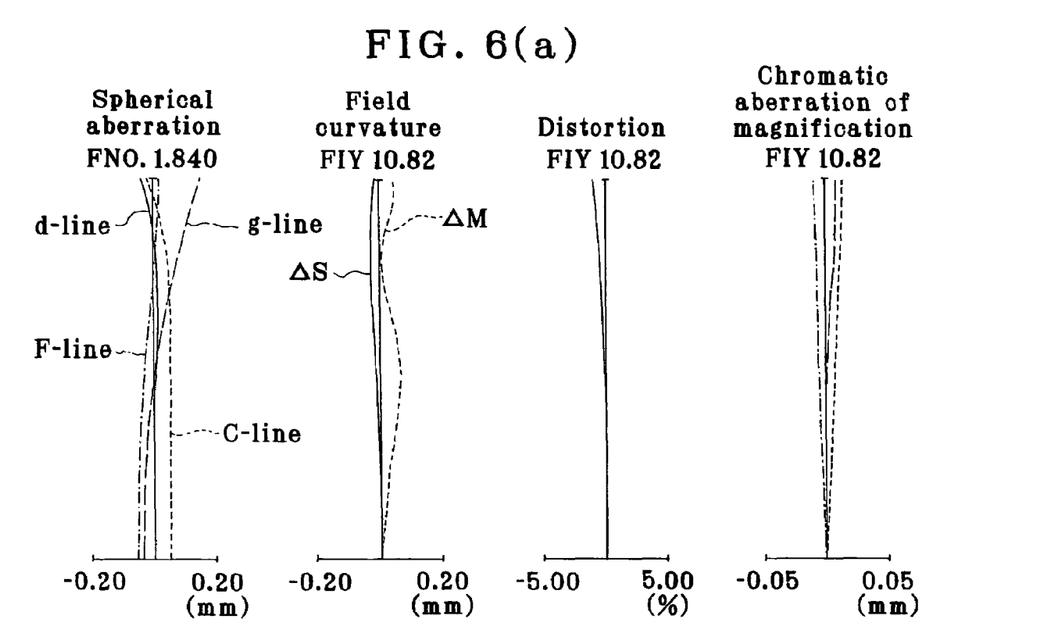
FIGS. 6(a) and 6(b) are similar to FIGS. 5(a) and (b), showing aberrations for Example 2.
Figure 6B:
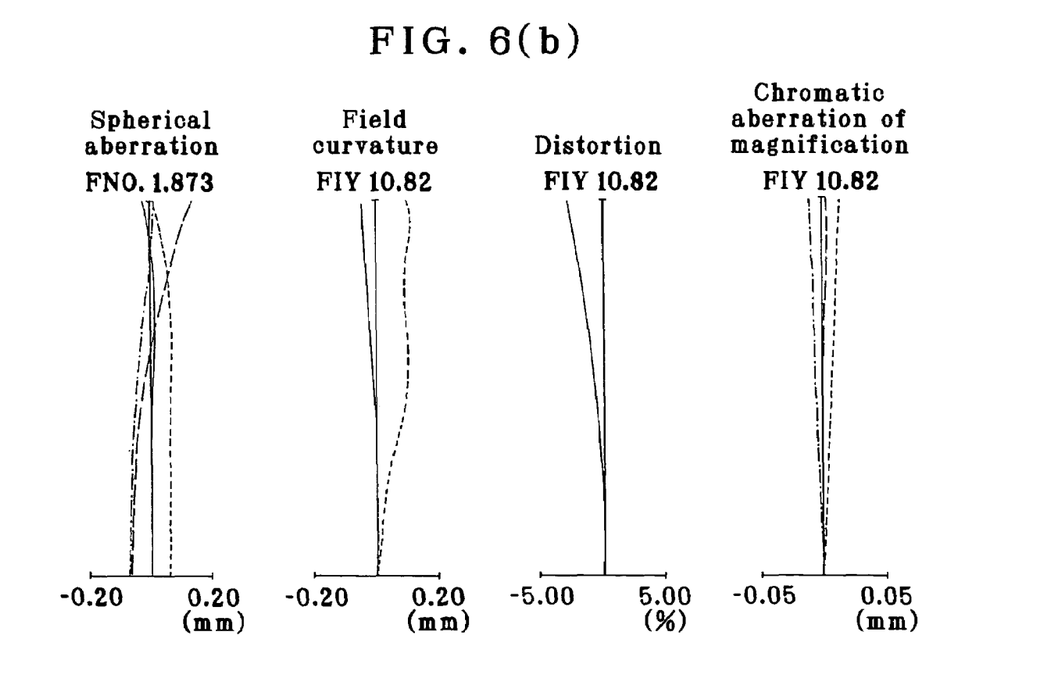
Figure 7A:
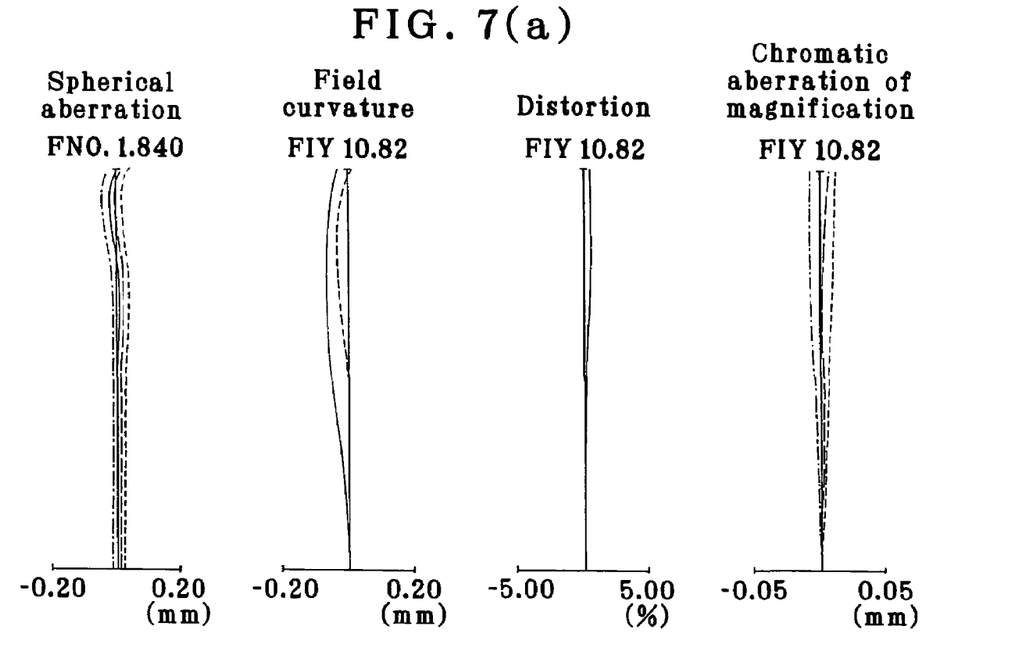
FIGS. 7(a) and 7(b) are similar to FIGS. 5(a) and (b), showing aberrations for Example 3.
Figure 7B:
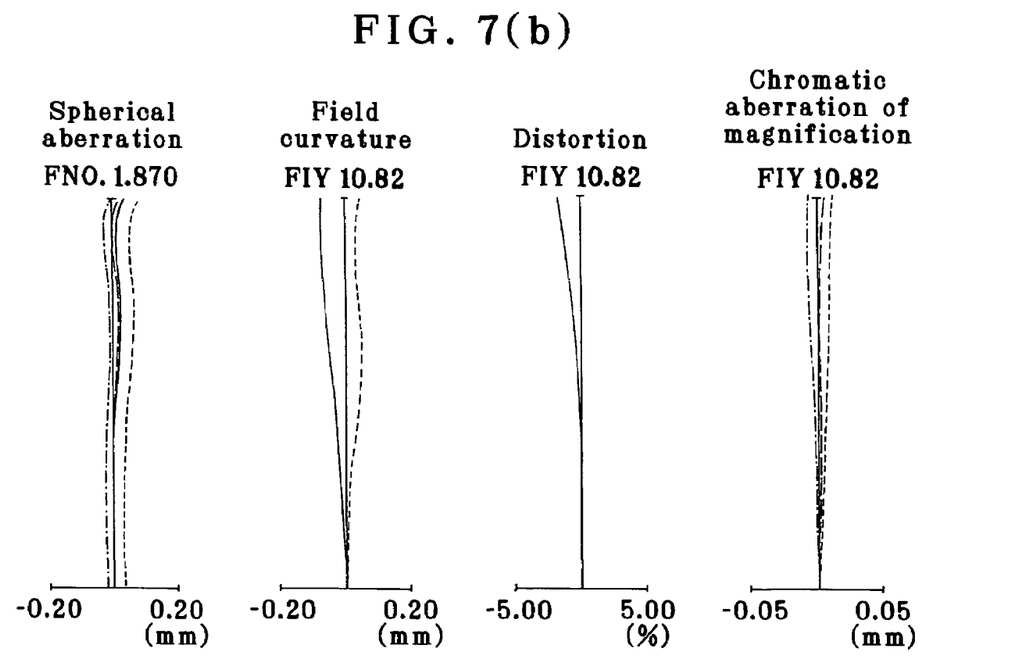
Figure 8A:
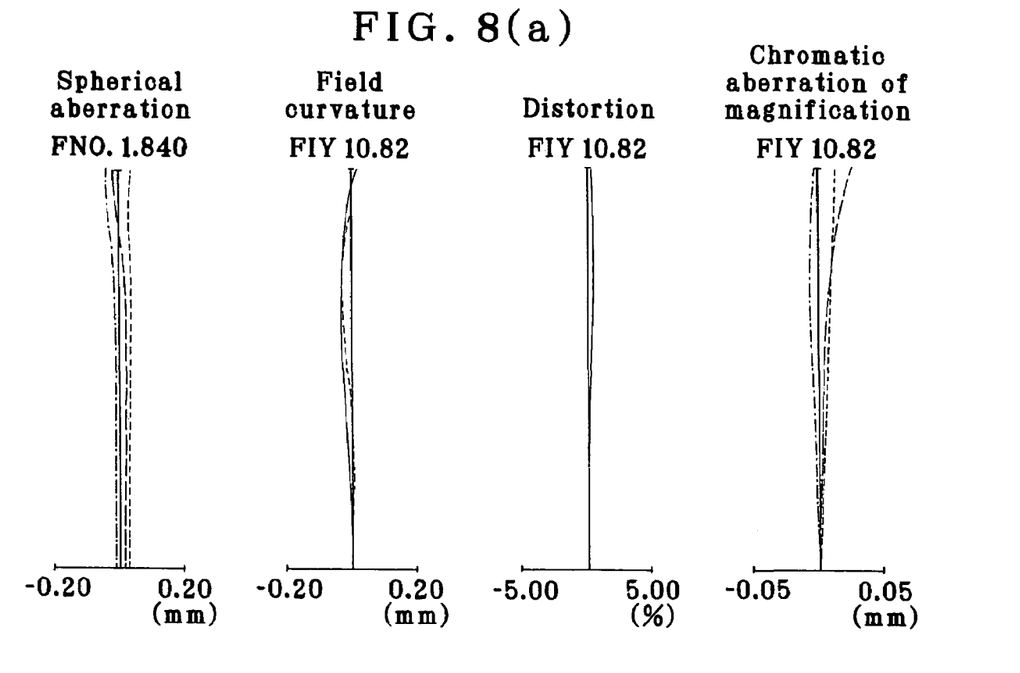
FIGS. 8(a) and 8(b) are similar to FIGS. 5(a) and (b), showing aberrations for Example 4.
Figure 8B:
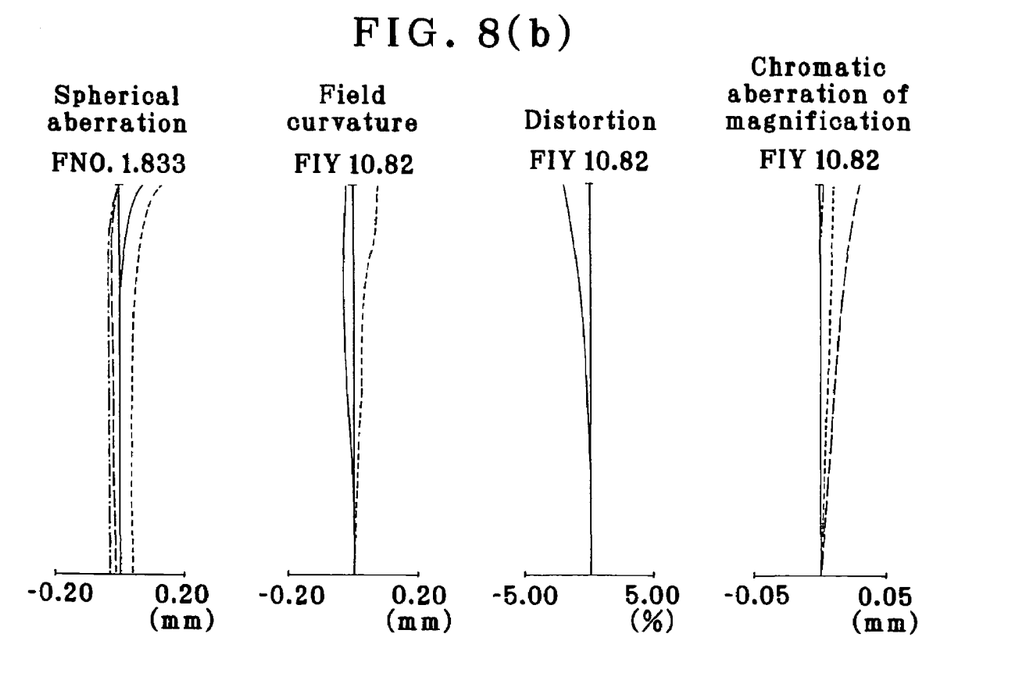

This example is directed to a taking lens system made up of, in order from its object side, a first lens group G1 of negative refracting power, a second lens group G2 of positive refracting power, an aperture stop S and a third lens group G3 of positive refracting power, as shown in FIGS. 4(a) and 4(b). Upon focusing from an infinite distance to a finite distance, the first lens group G1 stays fixed, the second lens group G2 moves toward the image side of the taking lens system, the aperture stop S moves toward the object side thereof, and the third lens group G3 moves toward the object side thereof.

Referring to the makeup of each lens group, the first lens group G1 consists of three negative meniscus lenses each convex on its object side, and the second lens group G2 consists of four lenses, i.e., a doublet of a negative meniscus lens convex on its object side and a double-convex positive lens and a doublet of a positive meniscus lens convex on its image side and a negative meniscus lens convex on its image side. The third lens group G3 consists of a subunit S3-1 (3-1) of negative refracting power and a subunit S3-2 (3-2) of positive refracting power, wherein the subunit S3-1 (3-1) is composed of two lenses, i.e., a doublet of a double-convex negative lens and a double-convex positive lens and the subunit S3-2 (3-2) is composed of two lenses, i.e., a double-convex positive lens and a positive meniscus lens convex on its image side.

Two aspheric surfaces are used, one at the image-side surface of the negative meniscus lens nearest to the image side of the first lens group G1 and another at the image-side surface of the double-convex positive lens in the subunit S3-2 (3-2) in the third lens group G3.

In the instant example, the taking lens system is focusable from an infinite object distance up to a nearby distance of 150 mm.

Numerical data on Examples 1–4 given above are set out just below. The symbols used hereinafter but not hereinbefore have the following meanings.

f: focal length of the taking lens system,
ω: half angle of view,
$f_B$: back focus,
$r_1, r_2, \ldots$: radius of curvature of each lens surface,
$d_1, d_2, \ldots$: spacing between adjacent lens surfaces,
$n_{d1}, n_{d2}, \ldots$ d-line refractive index of each lens
$v_{d1}, v_{d2}, \ldots$: Abbe number of each lens, and
$d_0$: object distance.

Here let x represent an optical axis provided that the direction of propagation of light is positive, and y indicate a direction orthogonal to that optical axis. Then, aspheric configuration is given by $$x=(y^2/r)/[1+\{1-(K+1)(y/r)^2\}^{1/2}]+A_4y^4+A_6y^6+A_8y^8+A_{10}y^{10}$$

where r is a paraxial radius of curvature, K is a conical coefficient, and $A_4, A_6, A_8$ and $A_{10}$ are the $4^{th}$, $6^{th}$, $8^{th}$ and $10^{th}$ aspherical coefficients, respectively.

EXAMPLE 1 f = 12.55
ω = 40.77°
$f_B$ = 35.277
IM = 21.64
$f_2$ = 375.76
$f_B$/IM = 1.63
$f_2$/f = 29.94

| | | | |
|---|---|---|---|
| $r_1$ = 33.6504 | $d_1$ = 4.0000 | $n_{d1}$ = 1.77250 | $v_{d1}$ = 49.60 |
| $r_2$ = 14.0282(Aspheric) | $d_2$ = (Variable) | | |
| $r_3$ = 79.9189 | $d_3$ = 2.0000 | $n_{d2}$ = 1.80400 | $v_{d2}$ = 46.57 |
| $r_4$ = 20.1501 | $d_4$ = 1.5000 | | |
| $r_5$ = 41.1144 | $d_5$ = 7.2206 | $n_{d3}$ = 1.54814 | $v_{d3}$ = 45.79 |
| $r_6$ = −12.9519 | $d_6$ = 2.0000 | $n_{d4}$ = 1.77250 | $v_{d4}$ = 49.60 |
| $r_7$ = 312.8052 | $d_7$ = 0.1500 | | |
| $r_8$ = 55.6171 | $d_8$ = 7.8101 | $n_{d5}$ = 1.80518 | $v_{d5}$ = 25.42 |
| $r_9$ = −42.3338 | $d_9$ = (Variable) | | |
| $r_{10}$ = ∞ (Stop) | $d_{10}$ = (Variable) | | |
| $r_{11}$ = −60.8936 | $d_{11}$ = 2.0000 | $n_{d6}$ = 1.80518 | $v_{d6}$ = 25.42 |
| $r_{12}$ = 210.3818 | $d_{12}$ = 2.0000 | | |
| $r_{13}$ = −103.2315 | $d_{13}$ = 3.4446 | $n_{d7}$ = 1.78800 | $v_{d7}$ = 47.37 |
| $r_{14}$ = −43.3899(Aspheric) | $d_{14}$ = 0.3248 | | |
| $r_{15}$ = 355.8635 | $d_{15}$ = 5.9879 | $n_{d8}$ = 1.49700 | $v_{d8}$ = 81.54 |
| $r_{16}$ = −38.2367 | $d_{16}$ = 0.1500 | | |
| $r_{17}$ = −447.6224 | $d_{17}$ = 5.4317 | $n_{d9}$ = 1.60311 | $v_{d9}$ = 60.64 |
| $r_{18}$ = −40.0638 | $d_{18}$ = 0.1500 | | |
| $r_{19}$ = −283.3681 | $d_{19}$ = 2.0000 | $n_{d10}$ = 1.80518 | $v_{d10}$ = 25.42 |
| $r_{20}$ = 35.6465 | $d_{20}$ = 9.0405 | $n_{d11}$ = 1.60311 | $v_{d11}$ = 60.64 |
| $r_{21}$ = −33.7007 | $d_{21}$ = (Variable) | | |
| $r_{22}$ = ∞ | $d_{22}$ = 4.2000 | $n_{d12}$ = 1.51633 | $v_{d12}$ = 64.14 |
| $r_{23}$ = ∞ | $d_{23}$ = 2.5069 | | |
| $r_{24}$ = ∞(Image plane) | | | |

Aspherical Coefficients

2nd surface

K = −0.9181
$A_4$ = 2.2158 × $10^{-5}$
$A_6$ = 1.7270 × $10^{-8}$
$A_8$ = 1.0768 × $10^{-10}$
$A_{10}$ = 0.0000

14th surface

K = −2.8760
$A_4$ = 9.1181 × $10^{-6}$
$A_6$ = 1.1697 × $10^{-8}$
$A_8$ = −3.2446 × $10^{-12}$
$A_{10}$ = 2.1853 × $10^{-14}$

Variable Spaces

| | | |
|---|---|---|
| $d_0$ | ∞ | 150.00000 |
| $d_2$ | 22.94977 | 24.49437 |
| $d_9$ | 7.34522 | 5.80062 |
| $d_{10}$ | 3.83282 | 3.00000 |
| $d_{21}$ | 30.00000 | 30.83282 |

EXAMPLE 2 f = 12.55
ω = 40.77°
$f_B$ = 35.277
IM = 21.64
$f_2$ = 122.75
$f_B$/IM = 1.63
$f_2$/f = 9.78

| | | | |
|---|---|---|---|
| $r_1$ = 34.7869 | $d_1$ = 2.0000 | $n_{d1}$ = 1.77250 | $v_{d1}$ = 49.60 |
| $r_2$ = 16.2237 | $d_2$ = 7.1717 | | |
| $r_3$ = 41.7532 | $d_3$ = 3.5469 | $n_{d2}$ = 1.80518 | $v_{d2}$ = 25.42 |
| $r_4$ = 103.0721 | $d_4$ = 0.1500 | | |
| $r_5$ = 25.9065 | $d_5$ = 2.0000 | $n_{d3}$ = 1.48749 | $v_{d3}$ = 70.23 |
| $r_6$ = 10.6696(Aspheric) | $d_6$ = (Variable) | | |
| $r_7$ = 95.4643 | $d_7$ = 4.5445 | $n_{d4}$ = 1.57501 | $v_{d4}$ = 41.50 |
| $r_8$ = −10.1692 | $d_8$ = 2.0000 | $n_{d5}$ = 1.77250 | $v_{d5}$ = 49.60 |
| $r_9$ = 193.6844 | $d_9$ = 0.1000 | | |
| $r_{10}$ = 42.5027 | $d_{10}$ = 2.6873 | $n_{d6}$ = 1.80518 | $v_{d6}$ = 25.42 |
| $r_{11}$ = −128.1902 | $d_{11}$ = (Variable) | | |
| $r_{12}$ = ∞ (Stop) | $d_{12}$ = (Variable) | | |
| $r_{13}$ = −35.0299 | $d_{13}$ = 2.0000 | $n_{d7}$ = 1.80518 | $v_{d7}$ = 25.42 |
| $r_{14}$ = 27.1767 | $d_{14}$ = 4.7099 | $n_{d8}$ = 1.58913 | $v_{d8}$ = 61.14 |
| $r_{15}$ = −38.0739 | $d_{15}$ = 0.1500 | | |
| $r_{16}$ = 47.8802 | $d_{16}$ = 4.1653 | $n_{d9}$ = 1.58913 | $v_{d9}$ = 61.14 |
| $r_{17}$ = −36.6897(Aspheric) | $d_{17}$ = 0.1500 | | |
| $r_{18}$ = −68.0376 | $d_{18}$ = 2.0000 | $n_{d10}$ = 1.80518 | $v_{d10}$ = 25.42 |
| $r_{19}$ = −172.1490 | $d_{19}$ = 4.2606 | $n_{d11}$ = 1.77250 | $v_{d11}$ = 49.60 |
| $r_{20}$ = −24.2548 | $d_{20}$ = (Variable) | | |
| $r_{21}$ = ∞ | $d_{21}$ = 4.2000 | $n_{d12}$ = 1.51633 | $v_{d12}$ = 64.14 |
| $r_{22}$ = ∞ | $d_{22}$ = 2.5069 | | |
| $r_{23}$ = ∞ (Image plane) | | | |

Aspherical Coefficients

6th surface

K = −0.4515
$A_4$ = −4.6778 × $10^{-5}$
$A_6$ = −3.4610 × $10^{-7}$
$A_8$ = −2.6741 × $10^{-9}$
$A_{10}$ = 0.0000

17th surface

K = 0
$A_4$ = 2.9864 × $10^{-5}$
$A_6$ = 8.1338 × $10^{-9}$
$A_8$ = 1.9789 × $10^{-12}$
$A_{10}$ = 0.0000

Variable Spaces

| | | |
|---|---|---|
| $d_0$ | ∞ | 150.00000 |
| $d_6$ | 17.05685 | 17.28525 |
| $d_{11}$ | 4.52680 | 4.70882 |
| $d_{12}$ | 6.11814 | 4.69773 |
| $d_{20}$ | 30.00000 | 31.00999 |

EXAMPLE 3 f = 12.20
ω = 41.56°
$f_B$ = 35.274
IM = 21.64
$f_2$ = 249.68
$f_B$/IM = 1.63
$f_2$/f = 20.46

| | | | |
|---|---|---|---|
| $r_1$ = 25.7587 | $d_1$ = 2.0000 | $n_{d1}$ = 1.72916 | $v_{d1}$ = 54.68 |
| $r_2$ = 14.5160 | $d_2$ = 8.0114 | | |
| $r_3$ = 21.4779 | $d_3$ = 2.0509 | $n_{d2}$ = 1.51633 | $v_{d2}$ = 64.14 |
| $r_4$ = 10.7046(Aspheric) | $d_4$ = 5.9987 | | |
| $r_5$ = 34.2468 | $d_5$ = 4.1207 | $n_{d3}$ = 1.69895 | $v_{d3}$ = 30.13 |
| $r_6$ = 60.1762 | $d_6$ = (Variable) | | |
| $r_7$ = 41.0046 | $d_7$ = 2.0000 | $n_{d4}$ = 1.72916 | $v_{d4}$ = 54.68 |
| $r_8$ = 8.8714 | $d_8$ = 5.8748 | $n_{d5}$ = 1.64769 | $v_{d5}$ = 33.79 |
| $r_9$ = 90.3027 | $d_9$ = 1.0000 | | |
| $r_{10}$ = −22.7154 | $d_{10}$ = 5.0119 | $n_{d6}$ = 1.69895 | $v_{d6}$ = 30.13 |
| $r_{11}$ = −8.5801 | $d_{11}$ = 2.5582 | $n_{d7}$ = 1.80100 | $v_{d7}$ = 34.97 |
| $r_{12}$ = −36.0826 | $d_{12}$ = 0.8188 | | |
| $r_{13}$ = 47.3492 | $d_{13}$ = 3.7261 | $n_{d8}$ = 1.77250 | $v_{d8}$ = 49.60 |
| $r_{14}$ = −577.3278 | $d_{14}$ = (Variable) | | |
| $r_{15}$ = ∞ (Stop) | $d_{15}$ = (Variable) | | |
| $r_{16}$ = −51.1868 | $d_{16}$ = 1.5000 | $n_{d9}$ = 1.80518 | $v_{d9}$ = 25.42 |
| $r_{17}$ = 30.5800 | $d_{17}$ = 4.9360 | $n_{d10}$ = 1.48749 | $v_{d10}$ = 70.23 |
| $r_{18}$ = −81.0257 | $d_{18}$ = 0.1500 | | |
| $r_{19}$ = 34.6262(Aspheric) | $d_{19}$ = 6.6319 | $n_{d11}$ = 1.43875 | $v_{d11}$ = 94.93 |
| $r_{20}$ = −21.7282(Aspheric) | $d_{20}$ = 0.1500 | | |
| $r_{21}$ = −134.0324 | $d_{21}$ = 5.7167 | $n_{d12}$ = 1.51633 | $v_{d12}$ = 64.14 |
| $r_{22}$ = −21.3461 | $d_{22}$ = (Variable) | | |
| $r_{23}$ = ∞ | $d_{23}$ = 4.2000 | $n_{d13}$ = 1.51633 | $v_{d13}$ = 64.14 |
| $r_{24}$ = ∞ | $d_{24}$ = 2.5037 | | |
| $r_{25}$ = ∞(Image plane) | | | |

Aspherical Coefficients

4th surface

K = −0.9388
$A_4$ = −6.7494 × $10^{-6}$
$A_6$ = −1.2010 × $10^{-7}$
$A_8$ = −1.1977 × $10^{-9}$
$A_{10}$ = 0.0000

19th surface

K = −6.0521
$A_4$ = −1.4568 × $10^{-5}$
$A_6$ = 7.8521 × $10^{-8}$
$A_8$ = −3.7664 × $10^{-10}$
$A_{10}$ = 0.0000

20th surface

K = 0
$A_4$ = 2.6936 × $10^{-5}$
$A_6$ = 6.8110 × $10^{-8}$
$A_8$ = −1.5114 × $10^{-10}$
$A_{10}$ = 0.0000

Variable Spaces

| | | |
|---|---|---|
| $d_0$ | ∞ | 150.00000 |
| $d_6$ | 5.53502 | 5.95355 |
| $d_{14}$ | 1.00000 | 1.02741 |
| $d_{15}$ | 4.50900 | 3.12971 |
| $d_{22}$ | 30.00000 | 30.93335 |

EXAMPLE 4 f = 12.20
ω = 41.57°
$f_B$ = 35.270
IM = 21.64
$f_2$ = 51.73
$f_B$/IM = 1.63
$f_2$/f = 4.24

| | | | |
|---|---|---|---|
| $r_1$ = 27.1466 | $d_1$ = 2.0000 | $n_{d1}$ = 1.72916 | $v_{d1}$ = 54.68 |
| $r_2$ = 14.9781 | $d_2$ = 6.7472 | | |
| $r_3$ = 19.4345 | $d_3$ = 2.0000 | $n_{d2}$ = 1.72916 | $v_{d2}$ = 54.68 |
| $r_4$ = 13.9731 | $d_4$ = 2.7937 | | |
| $r_5$ = 16.9952 | $d_5$ = 2.0000 | $n_{d3}$ = 1.49700 | $v_{d3}$ = 81.54 |
| $r_6$ = 10.6814(Aspheric) | $d_6$ = (Variable) | | |
| $r_7$ = 35.0430 | $d_7$ = 2.0000 | $n_{d4}$ = 1.72916 | $v_{d4}$ = 54.68 |
| $r_8$ = 10.2257 | $d_8$ = 6.7784 | $n_{d5}$ = 1.72825 | $v_{d5}$ = 28.46 |
| $r_9$ = −141.4052 | $d_9$ = 4.6624 | | |
| $r_{10}$ = −42.6858 | $d_{10}$ = 4.0090 | $n_{d6}$ = 1.60311 | $v_{d6}$ = 60.64 |
| $r_{11}$ = −10.1899 | $d_{11}$ = 1.4000 | $n_{d7}$ = 1.80518 | $v_{d7}$ = 25.42 |
| $r_{12}$ = −30.3384 | $d_{12}$ = (Variable) | | |
| $r_{13}$ = ∞ (Stop) | $d_{13}$ = (Variable) | | |
| $r_{14}$ = −31.5466 | $d_{14}$ = 1.5000 | $n_{d8}$ = 1.80100 | $v_{d8}$ = 34.97 |
| $r_{15}$ = 25.0509 | $d_{15}$ = 4.5966 | $n_{d9}$ = 1.48749 | $v_{d9}$ = 70.23 |
| $r_{16}$ = −31.4552 | $d_{16}$ = 0.1500 | | |
| $r_{17}$ = 49.5784 | $d_{17}$ = 3.6959 | $n_{d10}$ = 1.49700 | $v_{d10}$ = 81.54 |
| $r_{18}$ = −42.7447(Aspheric) | $d_{18}$ = 0.1500 | | |
| $r_{19}$ = −415.3378 | $d_{19}$ = 5.5499 | $n_{d11}$ = 1.72916 | $v_{d11}$ = 54.68 |
| $r_{20}$ = −22.6252 | $d_{20}$ = (Variable) | | |
| $r_{21}$ = ∞ | $d_{21}$ = 4.2000 | $n_{d12}$ = 1.51633 | $v_{d12}$ = 64.14 |
| $r_{22}$ = ∞ | $d_{22}$ = 2.4997 | | |
| $r_{23}$ = ∞(Image plane) | | | |

Aspherical Coefficients

6th surface

K = −0.8190
$A_4$ = −4.5482 × $10^{-5}$
$A_6$ = −3.0420 × $10^{-7}$
$A_8$ = −1.0248 × $10^{-9}$
$A_{10}$ = 0.0000

18th surface

K = 0
$A_4$ = 2.8776 × $10^{-5}$
$A_6$ = 1.2964 × $10^{-8}$
$A_8$ = −1.8297 × $10^{-11}$
$A_{10}$ = 0.0000

Variable Spaces

| | | |
|---|---|---|
| $d_0$ | ∞ | 150.00000 |
| $d_6$ | 11.90487 | 13.59517 |
| $d_{12}$ | 2.87862 | 1.00000 |
| $d_{13}$ | 8.48326 | 8.49462 |
| $d_{20}$ | 30.00000 | 30.17692 |

Figure 9:
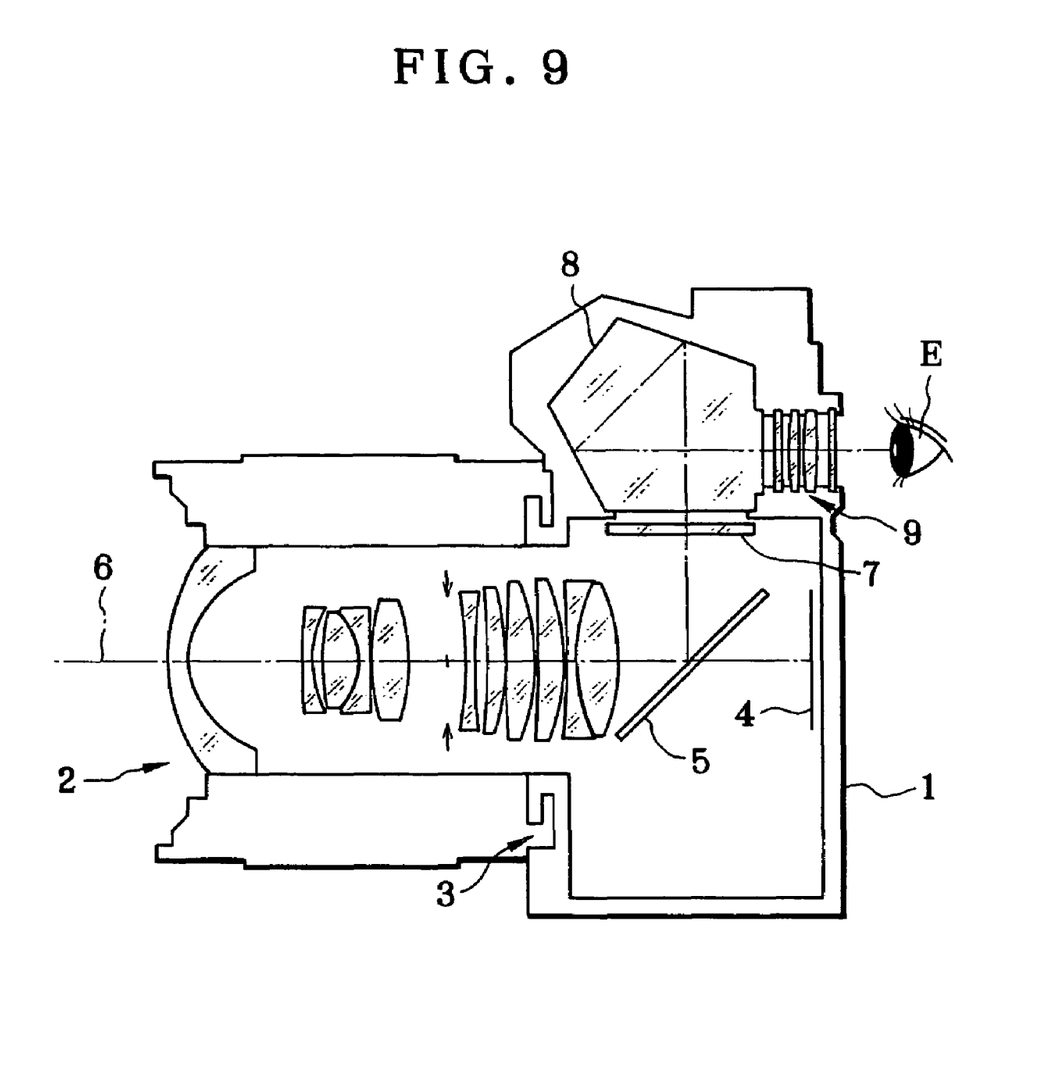
FIG. 9 is illustrative in section of a single-lens reflex camera in which the inventive taking lens system is incorporated.

FIG. 9 is a sectional schematic of a single-lens reflex camera that incorporates the inventive taking lens system and uses a small-format CCD or C-MOS as an image pickup device. In FIG. 9, reference numeral 1 stands for a single-lens reflex camera, 2 a taking lens system located within a lens barrel rigged with a focusing mechanism, and 3 a lens barrel's mount that makes the taking lens system 2 attachable to, or detachable from, the single-lens reflex camera 1 and for which, for instance, a screw or bayonet type mount could be used. In this embodiment, the bayonet type mount is used.

Reference numeral 4 represents an image pickup device's plane, 5 a quick return mirror interposed between the taking lens system 2 and the plane 4 of the image pickup device on the optical path of that lens system, 7 a finder screen located on a path of light reflected at the quick return mirror 5, 8 a penta prism, 9 a finder and E the eye of a viewer (eye point).

For the taking lens system 2 in the thus assembled single-lens reflex camera 1, for instance, the inventive taking lens system according to each of Examples 1–4 is used.

I claim:

1. A taking lens system comprising, in order from an object side thereof, a first lens group having negative refracting power, a second lens group having positive refracting power, an aperture stop and a third lens group having positive refracting power, wherein:
    focusing from an infinite distance to a finite distance is performed by setting said second lens group and said third lens group such that a position of said second lens group upon focusing on a finite distance is located on an image side of said taking lens system with respect to a position of said second lens group upon focusing on an infinite distance and a position of said third lens group upon focusing on a finite distance is located on an object side of said taking lens system with respect to a position of said third lens group upon focusing on an infinite distance, while said first lens group remains fixed, and
    wherein upon focusing from an infinite distance to a finite distance, said second lens group moves only toward the image side and said third lens group moves only toward the object side.

2. An imaging device, comprising the taking lens system as recited in claim 1, and an image pickup device located on an image plane side of said taking lens system.

3. A taking lens system comprising, in order from an object side thereof, a first lens group having negative refracting power a second lens group having positive refracting power, an aperture stop and a third lens group having positive refracting power, wherein:
    focusing from an infinite distance to a finite distance is performed by setting said second lens group and said third lens group such that a position of said second lens group upon focusing on a finite distance is located on an image side of said taking lens system with respect to a position of said second lens group upon focusing on an infinite distance and a position of said third lens group upon focusing on a finite distance is located on an object side of said taking lens system with respect to a position of said third lens group upon focusing on an infinite distance, while said first lens group remains fixed, and
    wherein each of said first lens group and said third lens group comprises an aspheric surface, wherein the aspheric surface in said first lens group is located in at least a position of a refracting surface nearest to an image plane side of the first lens group.

4. An imaging device, comprising the taking lens system as recited in claim 3, and an image pickup device located on an image plane side of said taking lens system.

5. A taking lens system comprising, in order from an object side thereof, a first lens group having negative refracting power, a second lens group having positive refracting power, an aperture stop and a third lens group having positive refracting power, wherein:
    focusing from an infinite distance to a finite distance is performed by setting said second lens group and said third lens group such that a position of said second lens group upon focusing on a finite distance is located on an image side of said taking lens system with respect to a position of said second lens group upon focusing on an infinite distance and a position of said third lens group upon focusing on a finite distance is located on an object side of said taking lens system with respect to a position of said third lens group upon focusing on an infinite distance, while said first lens group remains fixed, and
    the taking lens system satisfies condition (1):

$$f_B/IM > 1.5 \quad (1)$$

where $f_B$ is a distance of an exit surface in said third lens group to an image plane as calculated on an air basis, and JIM is an image circle of the taking lens system.

6. An imaging device, comprising the taking lens system as recited in claim 5, and an image pickup device located on an image plane side of said taking lens system.

7. A taking lens system comprising, in order from an object side thereof, a first lens group having negative refracting power, a second lens group having positive refracting power, an aperture stop and a third lens group having positive refracting power, wherein:
    focusing from an infinite distance to a finite distance is performed by setting said second lens group and said third lens group such that a position of said second lens group upon focusing on a finite distance is located on an image side of said taking lens system with respect to a position of said second lens group upon focusing on an infinite distance and a position of said third lens group upon focusing on a finite distance is located on an object side of said taking lens system with respect to a position of said third lens group upon focusing on an infinite distance, while said first lens group remains fixed, and
    the taking lens system satisfies condition (2):

$$f_2/f > 5.0 \quad (2)$$

where $f_2$ is a focal length of said second lens group, and f is a focal length of the entire taking lens system.

8. An imaging device, comprising the taking lens system as recited in claim 7, and an image pickup device located on an image plane side of said taking lens system.

9. A taking lens system comprising, in order from an object side thereof, a first lens group having negative refracting power, a second lens group having positive refracting power, an aperture stop and a third lens group having positive refracting power, wherein:
    focusing from an infinite distance to a finite distance is performed by setting said second lens group and said third lens group such that a position of said second lens group upon focusing on a finite distance is located on an image side of said taking lens system with respect to a position of said second lens group upon focusing on an infinite distance and a position of said third lens group upon focusing on a finite distance is located on an object side of said taking lens system with respect to a position of said third lens group upon focusing on an infinite distance, while said first lens group remains fixed, and
    wherein a second lens element located in said first lens group as counted from an object side thereof is a positive meniscus lens element convex on an object side thereof.

10. An imaging device, comprising the taking lens system as recited in claim 9, and an image pickup device located on an image plane side of said taking lens system.

11. A taking lens system comprising, in order from an object side thereof, a first lens group having negative refracting power, a second lens group having positive refracting power, an aperture stop and a third lens group having positive refracting power, wherein:

focusing from an infinite distance to a finite distance is performed by setting said second lens group and said third lens group such that a position of said second lens group upon focusing on a finite distance is located on an image side of said taking lens system with respect to a position of said second lens group upon focusing on an infinite distance and a position of said third lens group upon focusing on a finite distance is located on an object side of said taking lens system with respect to a position of said third lens group upon focusing on an infinite distance, while said first lens group remains fixed, and wherein said third lens group located in the image side thereof with respect to said aperture stop comprises, in order from an object side thereof a subunit 3-1 having negative refracting power, a subunit 3-2 having positive refracting power, and a subunit 3-3 comprising a lens element of negative refracting power and a lens element of positive refracting power.

12. An imaging device, comprising the taking lens system as recited in claim 11, and an image pickup device located on an image plane side of said taking lens system.

13. A taking lens system comprising, in order from an object side thereof, a first lens group having negative refracting power, a second lens group having positive refracting power, an aperture stop and a third lens group having positive refracting power, wherein:

focusing from an infinite distance to a finite distance is performed by setting said second lens group and said third lens group such that a position of said second lens group upon focusing on a finite distance is located on an image side of said taking lens system with respect to a position of said second lens group upon focusing on an infinite distance and a position of said third lens group upon focusing on a finite distance is located on an object side of said taking lens system with respect to a position of said third lens group upon focusing on an infinite distance, while said first lens group remains fixed, and wherein said third lens group located in the image side thereof with respect to said aperture stop comprises, in order from an object side thereof, a subunit 3-1 having negative refracting power, and a subunit 3-2 having positive refracting power.

14. An imaging device, comprising the taking lens system as recited in claim 13, and an image pickup device located on an image plane side of said taking lens system.

15. A taking lens system comprising, in order from an object side thereof, a first lens group having negative refracting power, a second lens group having positive refracting power, an aperture stop and a third lens group having positive refracting power, wherein:

focusing from an infinite distance to a finite distance is performed by setting said second lens group and said third lens group such that a position of said second lens group upon focusing on a finite distance is located on an image side of said taking lens system with respect to a position of said second lens group upon focusing on an infinite distance and a position of said third lens group upon focusing on a finite distance is located on an object side of said taking lens system with respect to a position of said third lens group upon focusing on an infinite distance, while said first lens group remains fixed, and which further comprises a holder frame for holding said first lens group, said second lens group and said third lens group in place, and a mount for making said holder frame attachable to, and detachable from, a body portion of said taking lens system.

16. An imaging device, comprising the taking lens system as recited in claim 15, and an image pickup device located on an image plane side of said taking lens system.

* * * * *